INVENTOR.
FRANK LOCK
JOHN RAMOSKA
BY
ATTORNEY

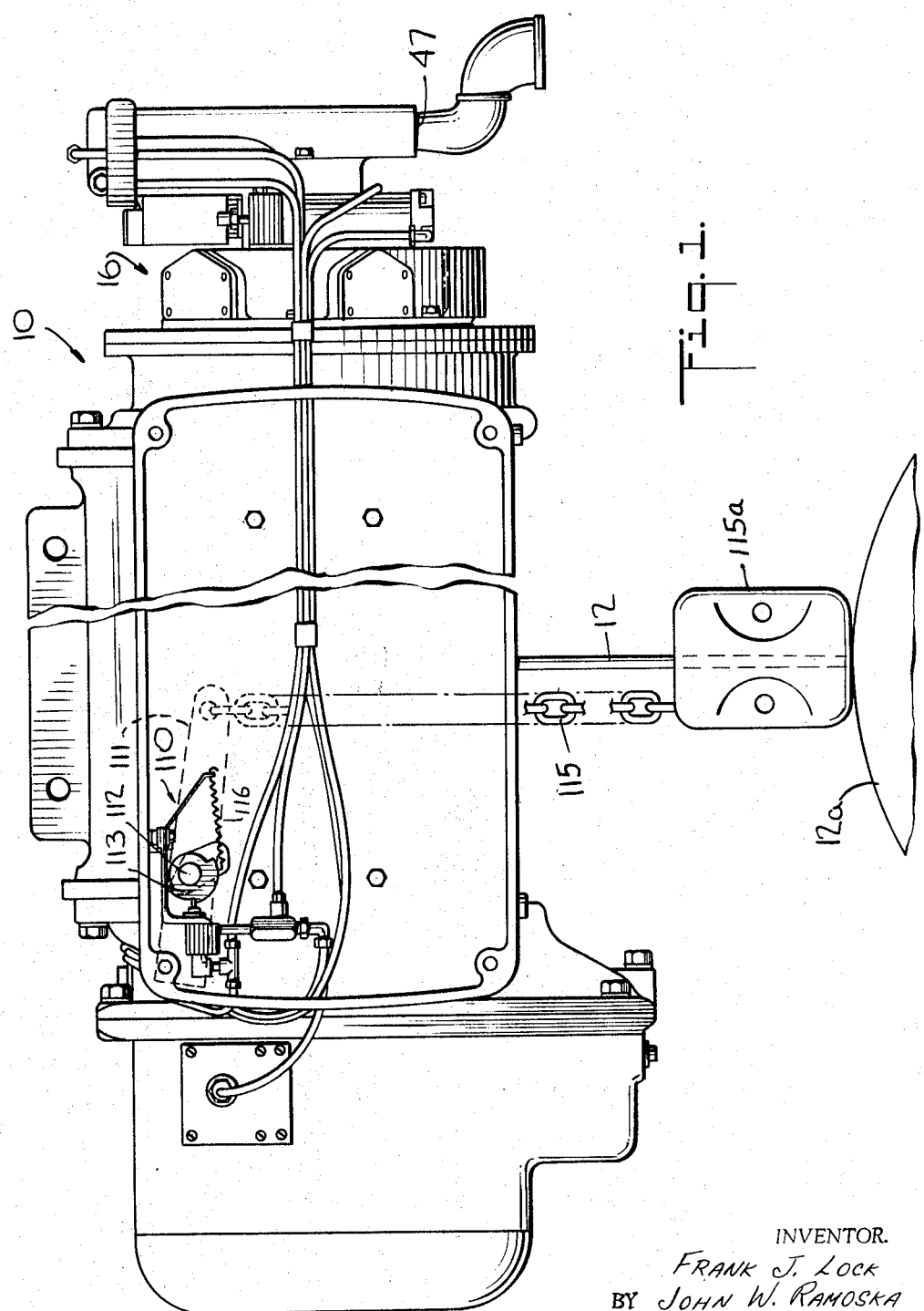

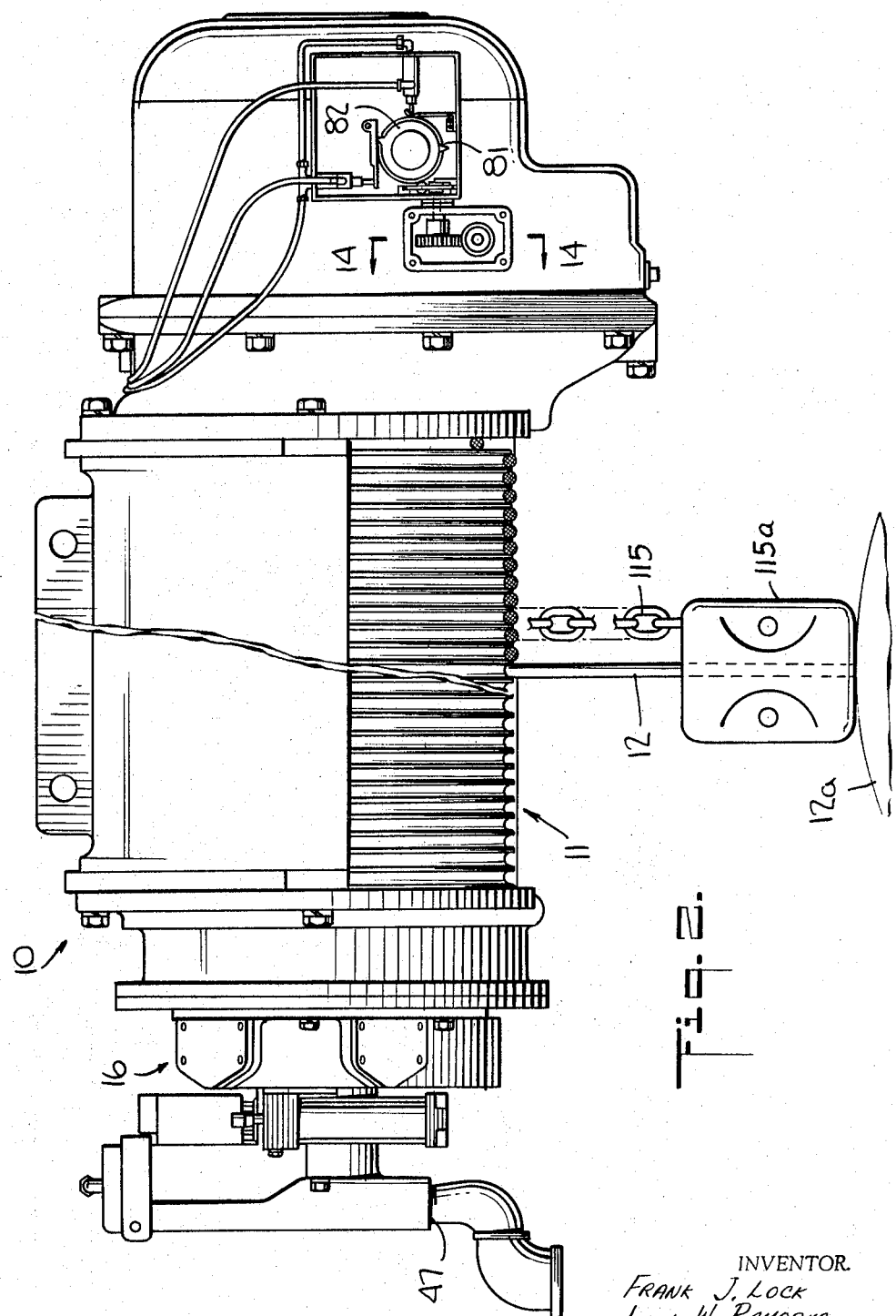

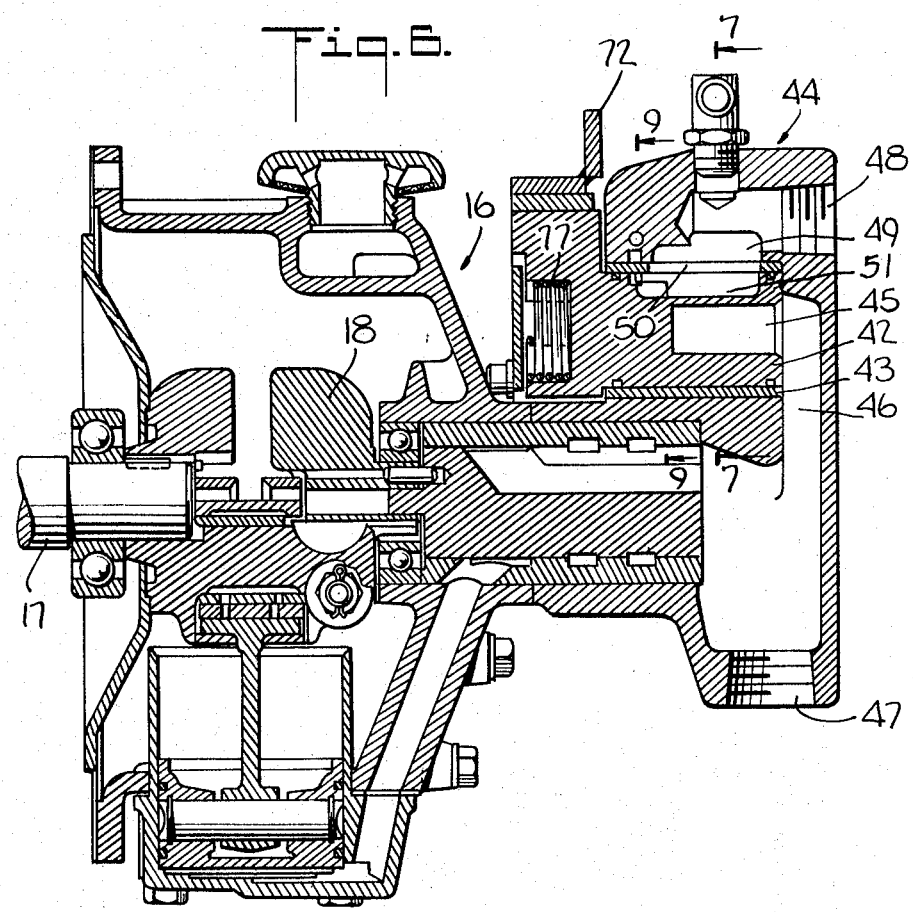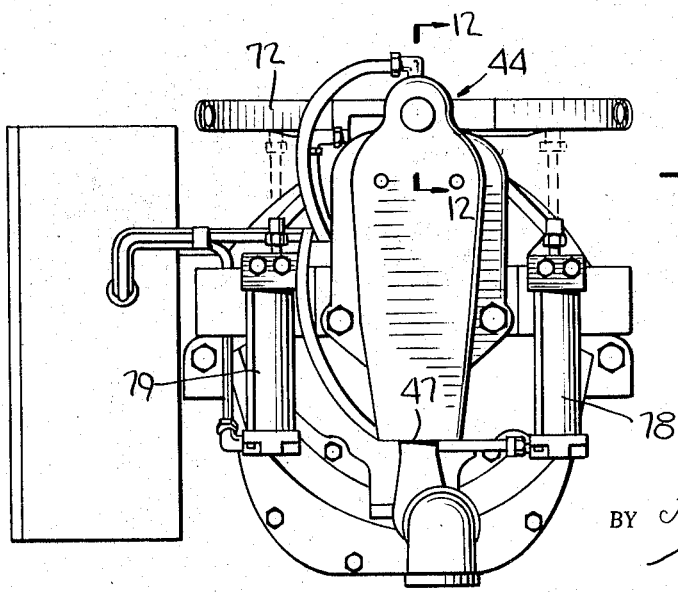

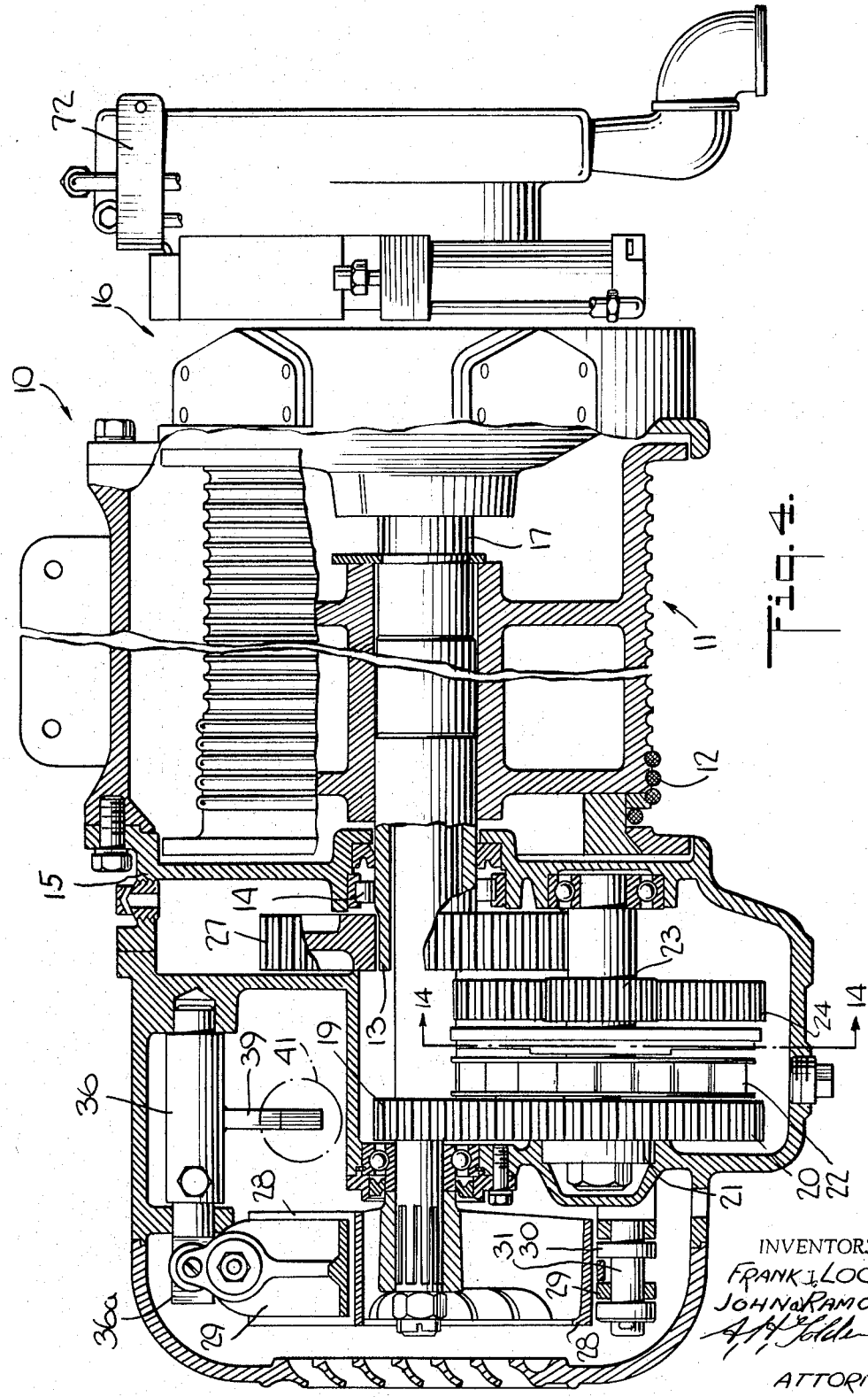

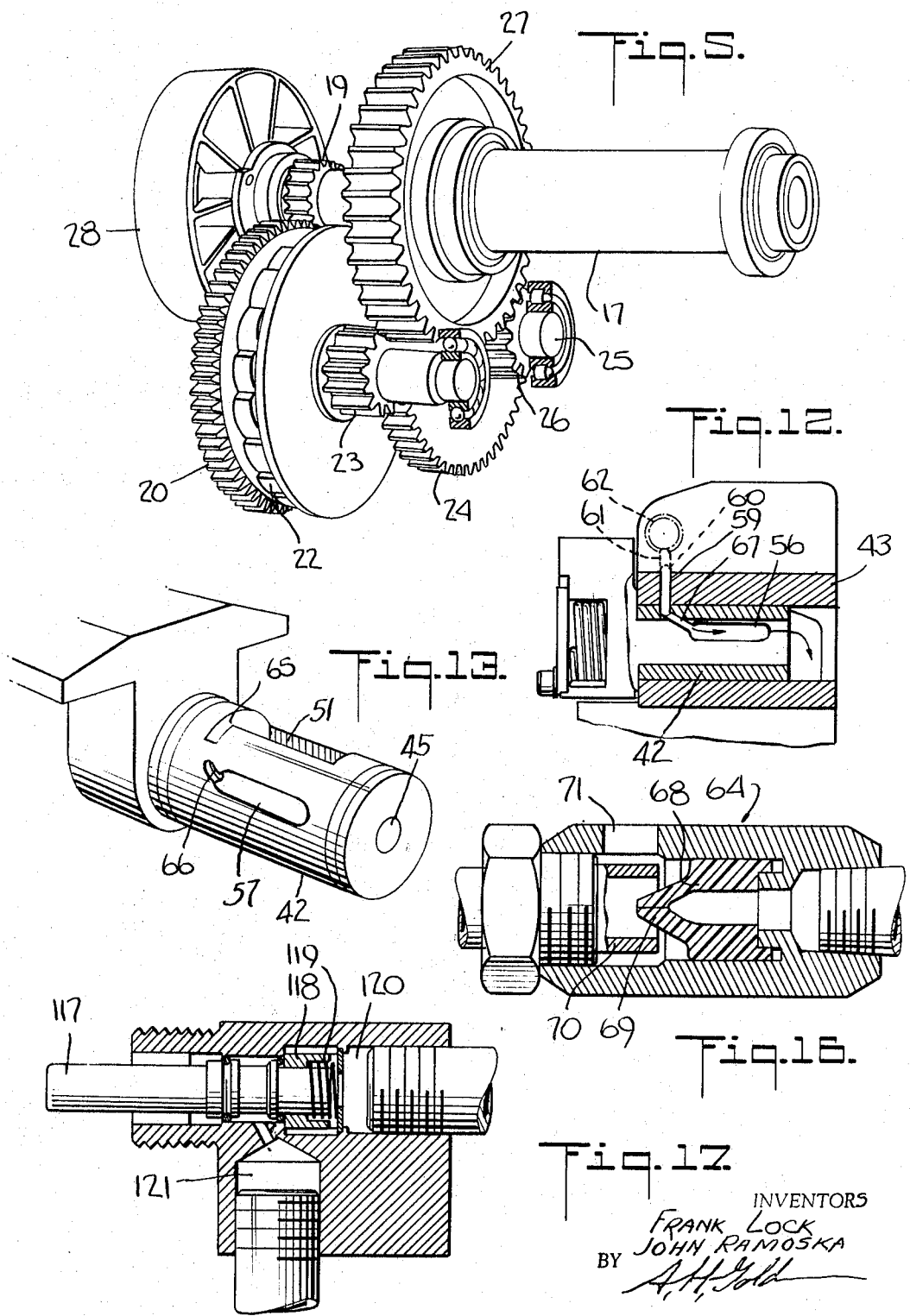

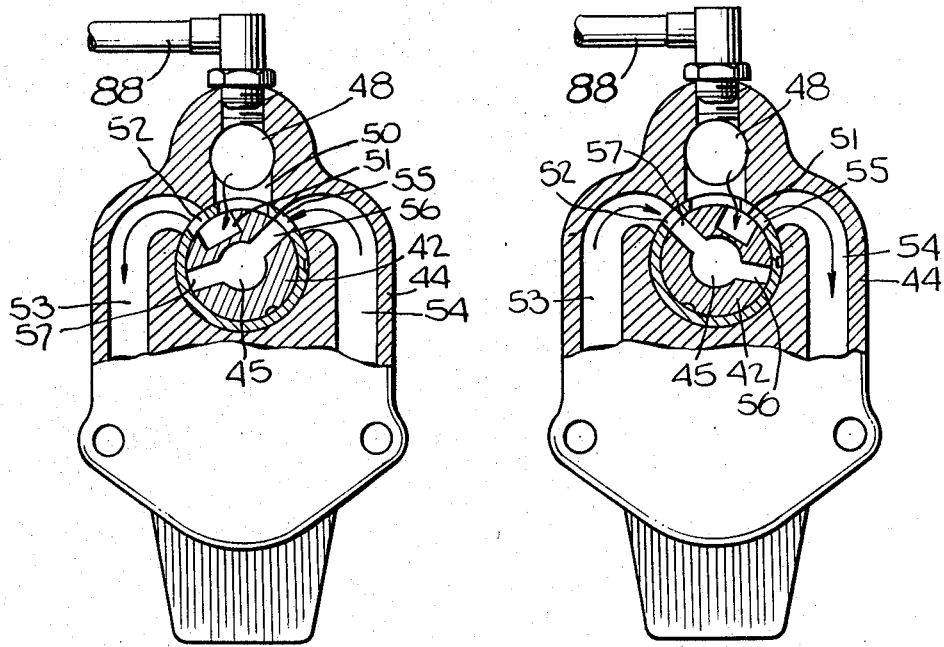
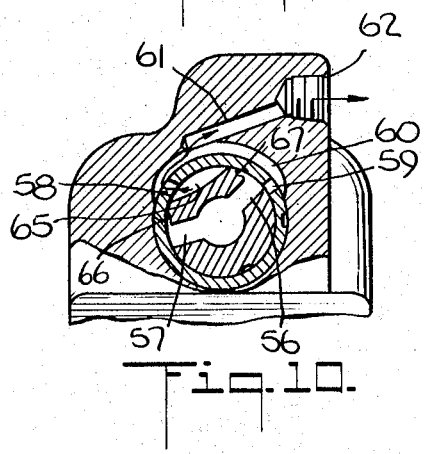
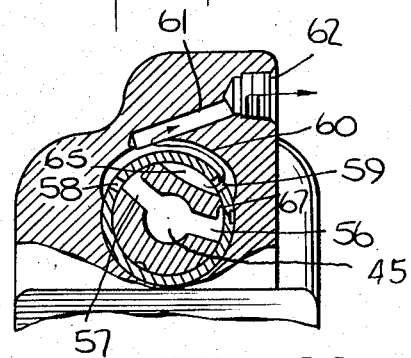
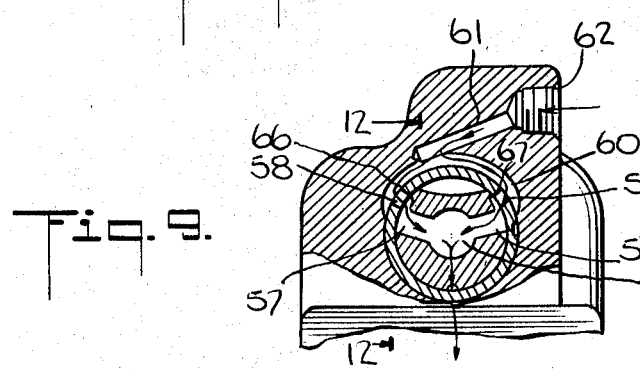

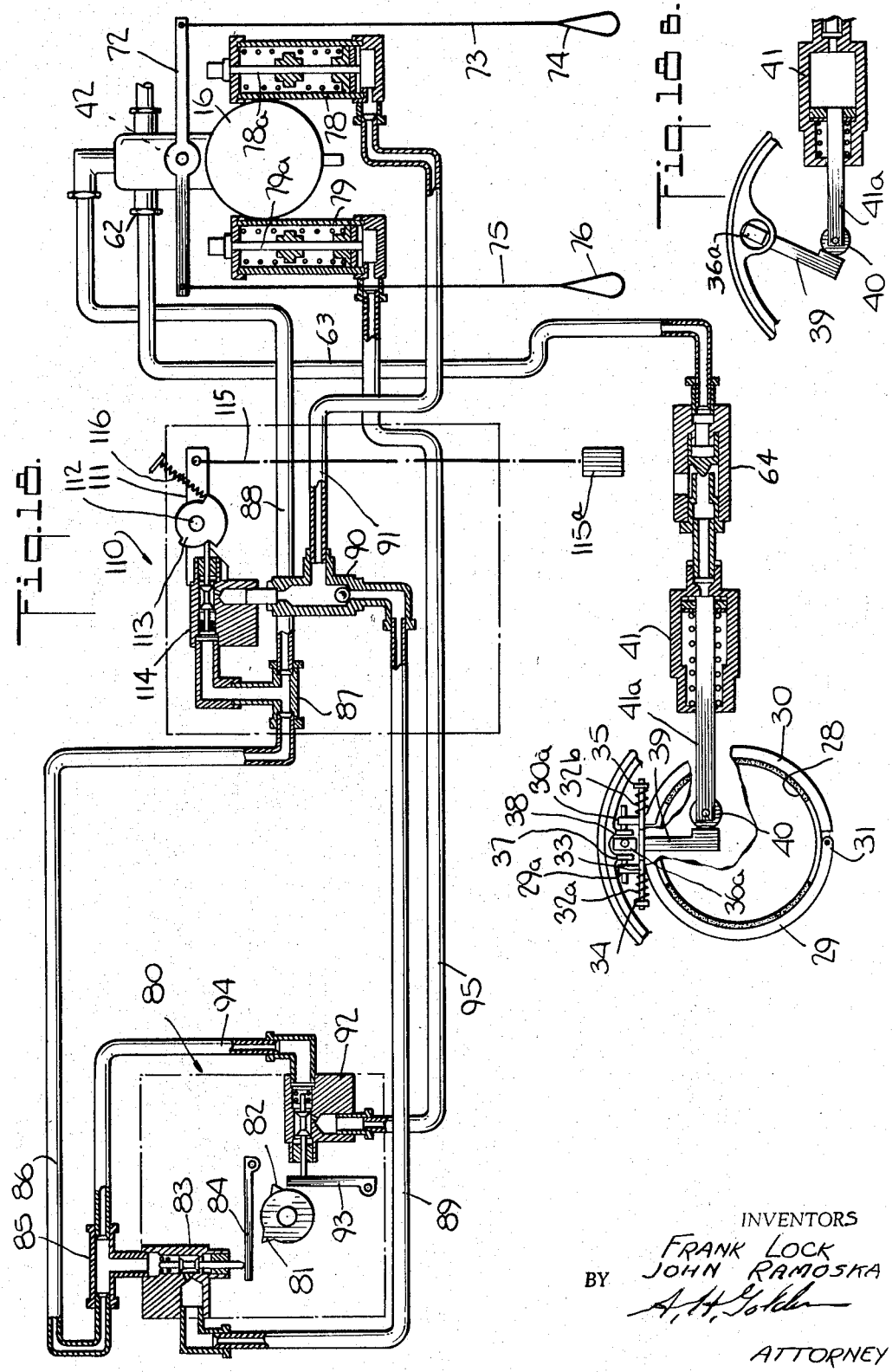

United States Patent Office 3,301,532
Patented Jan. 31, 1967

3,301,532
AUTOMATIC LIMIT CONTROL FOR AIR HOIST
Frank J. Lock and John W. Ramoska, Philadelphia, Pa., assignors to Eaton Yale & Towne Inc., a corporation of Ohio
Filed Sept. 23, 1964, Ser. No. 398,700
8 Claims. (Cl. 254—173)

This invention relates to a hoist operated by an air motor. More particularly, the invention relates to controls by which the brake of the hoist is released and the air motor operated to raise or lower a load, and by which the air motor is stopped and the brake applied when either an upper or lower limit of travel is reached.

The purpose of the invention is to provide a very simple, relatively inexpensive but very reliable air control system which will allow an air motor to be used in place of an electric motor of a conventional electric hoist, whereby the same hoist structure may be used with either an electric motor or an air motor in accordance with the customer's preference.

To this end, air cylinders are utilized for releasing the brake and for stopping operation of the air motor when certain limits of travel are reached, together with a very simple valving system for operating these cylinders.

As an important feature of the invention, there is provided a novel system for insuring quick actuation of the brake to bring the air motor to a substantially instantaneous stop whenever the air supply to the motor is stopped. More particularly, this novel system includes an arrangement wherein the pressure on the air cylinder for the brake is very quickly released, even though this cylinder is positioned some distance from the air motor and air control valve.

As a further feature of the invention, an arrangement is provided whereby the upper and lower limits of travel may be quickly and easily changed.

We have thus outlined rather broadly the more important features of our invention in order that the detailed description thereof that follows may be better understood, and in order that our contribution to the art may be better appreciated. There are, of course, additional features of our invention that will be described hereinafter and which will form the subject of the claims appended hereto. Those skilled in the art will appreciate that the conception on which our disclosure is based may readily be utilized as a basis for the designing of other structures for carrying out the several purposes of our invention. It is important, therefore, that the claims be regarded as including such equivalent constructions as do not depart from the spirit and scope of our invention, in order to prevent the appropriation of our invention by those skilled in the art.

Other objects and advantages of this present invention will become apparent from the following description when read in conjunction with the accompanying drawings wherein:

FIG. 1 is an elevational view of one side of a hoist constructed in accordance with the invention.

FIG. 2 is an elevational view of the opposite side of the hoist as shown in FIG. 1.

FIG. 3 is a right hand end view of the hoist as shown in FIG. 1.

FIG. 4 is a view similar to that shown in FIG. 1, with parts broken away to show the internal construction of the hoist.

FIG. 5 is a perspective view of the transmission of the hoist as removed from the hoist.

FIG. 6 is a sectional view of the air motor of the hoist.

FIG. 7 is a sectional view taken of the line 7—7 of FIG. 6 showing the control valve moved to a position for operating the air motor in one direction.

FIG. 8 is a sectional view similar to that of FIG. 7 showing the control valve moved to a position for operating the motor in an opposite direction.

FIG. 9 is a sectional view taken on the line 9—9 of FIG. 6 showing the portion of the control valve for operating the brakes in a neutral position.

FIG. 10 is a sectional view similar to FIG. 9, showing the valve moved to a position corresponding to that shown in FIG. 7, whereby the brakes are released when the air motor is operated in one direction.

FIG. 11 is a view similar to that shown in FIG. 9 showing the control valve moved to the position corresponding to that shown in FIG. 8, to release the brakes when the air motor is operated in the opposite direction.

FIG. 12 is a sectional view taken of the line 12—12 of FIG. 3.

FIG. 13 is a perspective view of the control valve as removed from the air motor.

FIG. 16 is a sectional view of the dumping valve for quickly releasing fluid pressure on the brake controlling air cylinder.

FIG. 17 is a sectional view of one of the control valves utilized in the air control system.

FIG. 18 is a diagrammatic showing of the hoist and air control system of the invention and FIG. 18b is a sectional view of the brake releasing cylinder of FIG. 18, showing the cylinder actuated to release the brakes.

Figure 15:
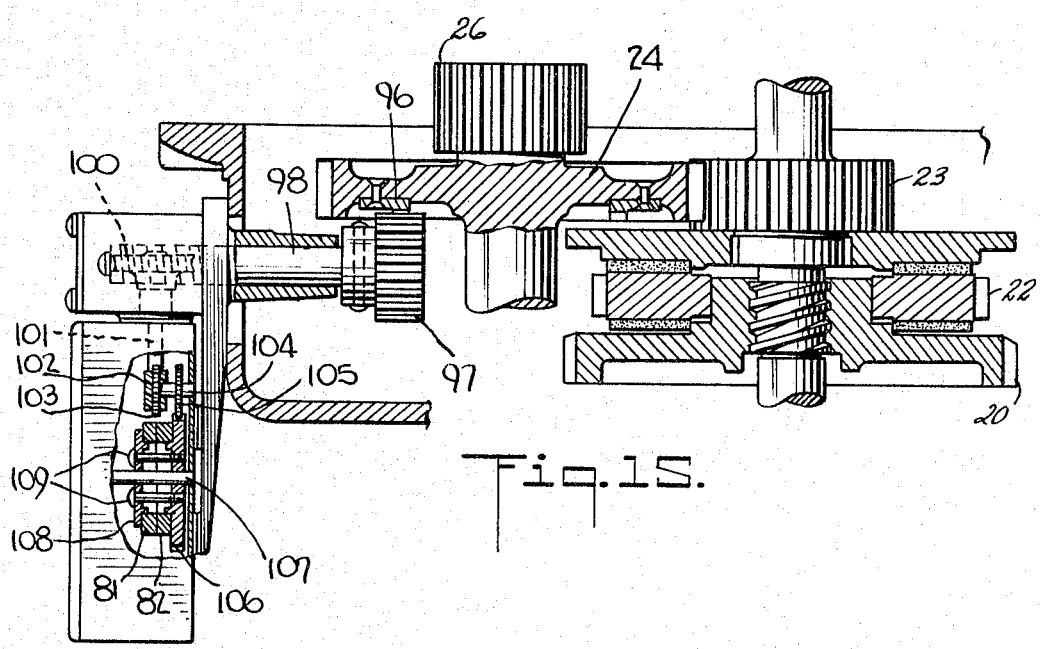
FIG. 15 is a sectional view taken of the line 15—15 of FIG. 14.

Referring to the drawings and particularly to FIG. 1 there is shown a hoist 10 constructed in accordance with the invention. The hoist 10 is of the cable drum type and includes, as best shown in FIGS. 2 and 4, a grooved drum 11 on which a lifting cable 12 may be wound or unwound to lift or lower a load engaging hook or block 12a (partially shown in FIGS. 1 and 2) which is secured to the end of the cable 12.

As shown in FIG. 4 the drum 11 is secured to a hollow shaft 13 which in turn is mounted for rotation in a housing 15 through suitable anti-friction bearings 14. The drum 11 is adapted to be rotated in opposed directions to wind or unwind the cable 12 from the drum by operation of an air motor 16 which is secured to one end of the casing 15.

The drum 11 is driven by the air motor 16 through a transmission including, as best shown in FIGS. 4 and 5, a shaft 17 which is secured at one end to the crankshaft 18 (shown in FIG. 6) of the air motor 16 and extends through the hollow shaft 13, a pinion 19 which is secured to the opposite end of the shaft 17, a gear 20 which is secured to a counter shaft 21 and meshes with the pinion 19, a conventional ratchet brake assembly 22, a pinion 23 which is adapted to be driven by the gear 20 through the ratchet brake assembly 22, a gear 24 which is secured to a second counter shaft 25, shown in FIG. 5, and meshes with the pinion 23, a pinion 26 which is also secured to the counter shaft 25, and a gear 27 which meshes with the pinion 26 and is secured to the hollow shaft 13 to which the cable drum 11 is secured. Thus operation of the air motor 16 in one direction serves to rotate the drum 11 in one direction through the transmission, and operation of the air motor 16 in the opposite direction serves to rotate the cable drum 11 in the opposite direction.

The ratchet brake assembly 22 serves to prevent rotation of the drum 11 in a direction to lower a load supported on the cable 12 and therefore hold the load against dropping unless the air motor 16 is operated to positively rotate the cable drum 11 in either the lowering or lifting direction.

As best shown in FIGS. 4 and 5, a brake drum 28 is secured to the end of the shaft 17. A pair of brake shoes 29 and 30, shown diagrammatically in FIG. 18, are pivotally mounted on a lower pivot 31 and surround the brake drum 28. The brake shoes 29 and 30 are normally urged into braking engagement with the brake drum 28 by brake springs 32a and 32b which surround a rod 33 extending through extensions 29a and 30a at the upper ends of the brake shoes 29 and 30. Brake spring 32a bears at one end against an adjustment nut 34 which is threaded on one end of the rod 33 and bears at the other end against the extension 29a of the brake shoe 29. The spring 32b bears at one end against an adjustment nut 35 threaded on the other end of the rod 33 and bears at the other end against the extension 30a of the brake shoes 30. The brake springs 32a and 32b therefore urge the two brake shoes 29 and 30 into braking engagement with the brake drum 28.

As best shown in FIG. 4, a shaft 36 is suitably journalled in the housing 15 adjacent the upper ends of the brake shoes 29 and 30 and has a cam shaped end portion 36a which, as best shown in FIG. 18, extends between pads 37 and 38 which are adjustably secured respectively to the extensions 29a and 30a of the brake shoes 29 and 30. When the cam portion 36a is in the position shown in FIG. 18, the brake springs 32a and 32b force the brake shoes 29 and 30 into braking engagement with the brake drum 28 and prevent rotation of the shaft 17. If the cam portion 36a is rotated to the position shown in FIG. 18b by rotation of the shaft 36, the brake shoes 29 and 30 are pivoted away from the brake drum 28 through yielding of the springs 32a and 32b releasing the braking force of the shoes on the drum 28 and allowing rotation of the brake drum 28 and the shaft 17 to which it is secured.

As shown in FIGS. 4 and 18, the shaft 36 is provided with a downwardly extending lever arm 39. The lower end of the lever arm 39 is engaged by a roller 40 which is secured to the end of a piston rod 41a of an air cylinder 41 which is secured to the housing 15. Operation of the air cylinder 41 to extend the piston rod 41a thereof forces the roller 40 against the lever arm 39 causing rotation of the shaft 36 and the cam portion 36a thereof to pivot the brake shoes 29 and 30 away from the brake drum 28 whereby to release the shaft 17 for rotation.

Referring now to FIG. 6, the air motor 16 is a radial motor of general conventional construction, and includes a rotary throttle valve 42 which, in accordance with the invention, controls the operation of both the air motor 16 and the air cylinder 41 for releasing the brake shoes 29 and 30. The throttle valve 42 is mounted for rotation in a sleeve 43 which is mounted in the valve chest 44 of the air motor 16, and the valve 42 has a central bore 45 which communicates through a passage 46 with an exhaust port 47 of the air motor 16. Air under pressure for operating the air motor 16 is introduced from a suitable source of air under pressure (not shown) through an inlet port 48 which is connected by a passage 49 with a port 50 through the valve sleeve 43.

The throttle valve 42 has an axially extending groove 51 formed in the surface thereof, and when the throttle valve 42 is rotated in the counter clockwise direction to the position shown in FIG. 7, the groove 51 connects the port 50 in the sleeve 43 with a port 52 in the sleeve 43 whereby air under pressure from the inlet port 48 is directed through a passage 53 to the cylinders of the air motor to effect operation of the air motor in one direction. At the same time air is exhausted from the cylinders through a passage 54, a port 55 through the sleeve 43, and a radial port 56 in the throttle valve 42 which connects with the center bore 45, so that air is exhausted out through the exhaust port 47.

If the throttle valve 42 is rotated in the clockwise direction to the position shown in FIG. 8, the groove 51 connects the port 50 with the port 55 whereby air under pressure from the inlet port 48 is directed through passage 54 to the cylinders of the air motor 16 to effect operation of the air motor 16 in the opposite direction. At this time air is exhausted through the passage 53, port 52, a port 57 in the throttle valve 42, the center bore 45 and the exhaust port 47.

Referring now to FIGS. 9, 10, 11, 12, the valve sleeve 43 in which the throttle valve 42 rotates, is also provided with a pair of spaced ports 58 and 59, both of which connect with a common passageway 60. The passageway 60 in turn is connected by a passage 61 with a port 62. As shown in FIG. 18 port 62 is connected by a line 63 and a dumping valve 64 to the air cylinder 41 for releasing the brake shoes 29 and 30. When the throttle valve 42 is rotated in the counter clockwise direction to start operation of the air motor 16, a slot 65 in the surface of the throttle valve 42 is simultaneously moved to a position connecting the groove 51 in the throttle valve 42 with the port 58, as shown in FIG. 10, whereby air under pressure is directed through the line 63 and dumping valve 64 to the air cylinder 41 to operate the air cylinder 41 and release the brake shoes 29 and 30.

If the throttle valve is rotated in a clockwise direction, to operate the air motor 16 in the opposite direction, the slot 65 is simultaneously moved to a position connecting the groove 51 with the port 59, as shown in FIG. 11, whereby air under pressure is admitted through the line 63 and the dumping valve 64 to operate the air cylinder 41 and to release brake shoes 29 and 30. Thus in either direction of rotation of the throttle valve 42 air is admitted to the cylinder 41 to release the brake shoes 29 and 30.

When the throttle valve is returned to the neutral position, as shown in FIG. 9, the ports 58 and 59 are connected with the ports 57 and 56 in the throttle valve 42 through small grooves 66 and 67 also formed in the surface of the throttle valve 42 whereby the pressure in the line 63 is relieved, allowing the dumping valve 64 to dump air from the air cylinder 41 to provide instantaneous application of the brake shoes 29 and 30 to the brake drum 28.

In this connection it will be noted from FIG. 16 that the dumping valve 64 includes a rubber valve element 68 having a tapered end 69 which is split into four quarters. When air under pressure is applied to the valve 64 through the line 63, the tapered end 69 expands, allowing air under pressure to pass through the valve to the air cylinder 41. At the same time the tapered end 69 of the rubber valve element 68 is pressed into sealing engagement with a tubular member 70 forming a part of the dumping valve 64 and prevents the escape of air through an exhaust port 71 in the valve. When the pressure in the line 63 is relieved, the tapered end 69 of the rubber valve element 68 contracts or closes, allowing the air from the air cylinder 51 to escape or dump through the exhaust port 71. As the dumping valve 64 is physically located closely adjacent the air cylinder 41 release of the pressure on the air cylinder 41 through the dumping valve ensures substantially instantaneous application of the brake shoes 29 and 30 to the brake drum 28, thereby preventing coasting of the drum and allowing accurate spotting of a load.

The throttle valve 42 is adapted to be rotated in either the counter clockwise or the clockwise direction, to both start operation of the air motor 16 and release the brake shoes 29 and 30, by means of an elongated lever 72 which is secured to and extends from each side of one end of the throttle valve 42. As diagrammatically shown in FIG. 18, a cable 73, having a handle 74 at the lower end thereof, is secured to one end of the lever 72, and a cable 75 having a handle 76 at the lower end thereof, is secured to the opposite end of the lever 72. By pulling downwardly on the handle 74 of the cable 73, the lever 72 and throttle valve 42 are rotated in a clockwise direction to simultaneously release the brake shoes 29 and 30 and to operate the air motor 16 in the lifting direction, and by pulling downwardly on the handle 76 of the cable 75, the lever 72 and the throttle valve 42 are rotated in a counter clockwise direction to simultaneously release the brake shoes 29 and 30 and operate the air motor 16 in the lowering direction. When the handles 74 and 76 are released, a torsion spring 77, shown in FIG. 6, returns the throttle valve 42 to a neutral position cutting off the supply of air under pressure to the air motor 16 and simultaneously releasing the air pressure on the air cylinder 41 to allow brake shoes 29 and 30 to be applied to the brake drum 28.

The air control system of the invention whereby the air motor 16 is stopped and the brakes 29 and 30 are applied wherever an upper or lower limit of travel is reached includes, as diagrammatically shown in FIG. 18, a pair of air cylinders 78 and 79 which are secured one to each side of the air motor 16 with the piston rods 78a and 79a thereof extending toward the lever 72.

The stroke of the piston rod 78a is such that when the cyliner 78 is operated to extend the piston rod 78a, the piston rod engages and pivots lever 72 back to neutral position against manual force applied to the handle 74 and holding the lever 72 and the valve 42 in a clockwise rotated position.

Similarly, the stroke of the piston rod 79a is such that when the air cylinder 79 is operated to extend the piston rod 79a, the piston rod engages the lever 72 to pivot the lever 72 back to neutral position against manual force applied to the handle 76 and holding the lever 72 and the valve 42 in a counter clockwise rotated position.

Thus, operation of the air cylinder 78 will pivot the lever 72 to neutral position and stop operation of the air motor 16 in the lifting direction and apply the brakes 29 and 30, and operation of the air cylinder 79 will pivot the lever 72 to neutral position to stop the operation of the air motor 16 in the lowering direction and apply the brakes 29 and 30.

The operation of the air cylinder 78 and the operation of the air cylinder 79 are controlled by a mechanism generally indicated at 80 in FIG. 18. The mechanism 80 includes a pair of cams 81 and 82 which, as will be described in more detail hereafter, are rotated at a reduced speed from the transmission of the hoist and therefore measure the number of rotations of the cable drum 11 and the length of cable 12 payed out or taken up.

When the cam 81 has rotated a predetermined distance corresponding to a predetermined rotation of the cable drum 11 in the lifting direction, the cam 81 actuates a normally closed valve 83 through a lever 84. One side of the valve 83 is connected through a T 85, a line 86, a T 87 and a line 88 with the inlet port 48 through which the air is introduced under pressure for operating the air motor 16. The opposite side of the valve 83 is connected by a line 89, a shuttle valve 90 and a line 91 to the air cylinder 78. Operation of the valve 83 by the cam 81, therefore, admits air under pressure to the cylinder 78 to extend the piston rod 78a thereof to pivot the lever 72 to neutral position thereby applying the brakes 29 and 30 and stopping operation of the air motor 16. At the same time, however, the lever 72 may be pivoted in the counter clockwise direction to operate the air motor 16 in the lowering direction, as the air cylinder 79 is not operated at this time.

When the cam 82 is rotated a predetermined distance corresponding to a predetermined number of rotations of the cable drum 11 in the lowering direction, cam 82 actuates a valve 92 through a lever 93. One side of the valve 92 is connected through a line 94 with the T 85 whereby air under pressure is applied to the valve 92. The other side of the valve 92 is connected through a line 95 with the air cylinder 79. Actuation of the valve 92 by the cam 82, therefore, admits air under pressure to the air cylinder 79 to extend the piston rod 79a thereof and pivot the lever 72 to neutral position thereby applying brakes 29 and 30 and stopping operation of the air motor 16 in the lowering direction. Thus, by proper adjustment of the positions of the cams 81, 82 upper and lower limits of travel are established and the air motor 16 will be stopped and the brakes 29 and 30 applied when these limits are reached.

Figure 14:
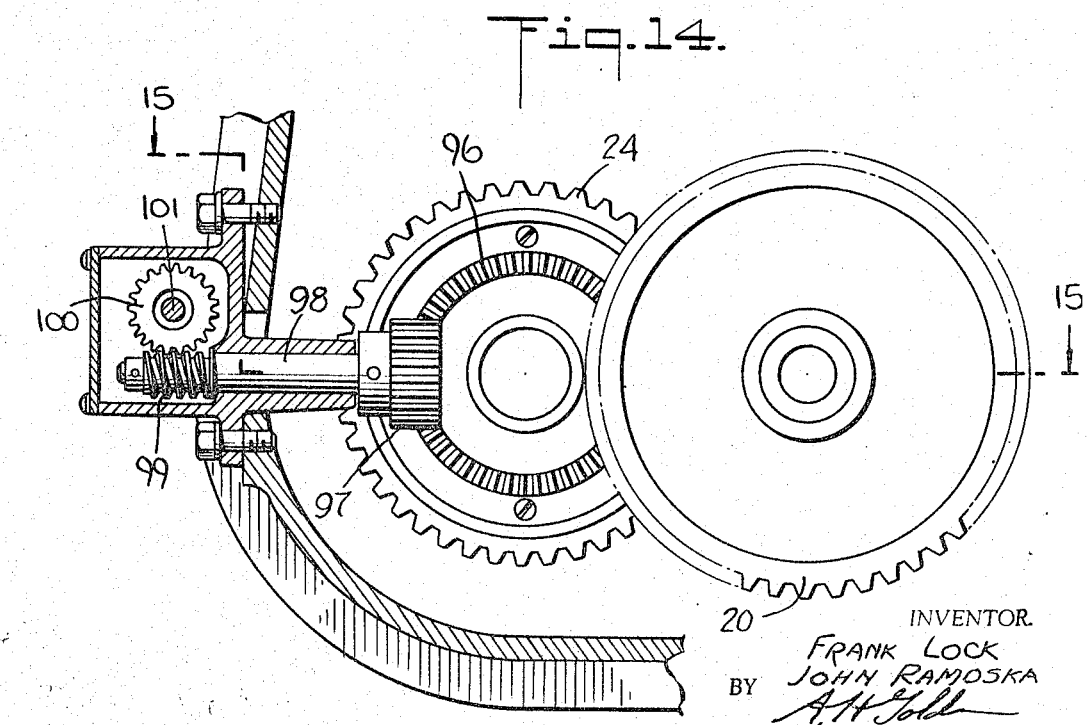
FIG. 14 is a sectional view taken of the line 14—14 of FIGS. 2 and 4.

Referring now to FIGS. 14 and 15, cams 81 and 82 are driven from the transmissions of the hoist from a ring gear 96 which is secured to the side of the gear 24, a pinion 97 which is secured to one end of a shaft 98 and meshes with the ring gear 96, a worm 99 which is secured to the opposite end of the shaft 98, a worm wheel 100 which is secured to a shaft 101, a worm 102 which is secured to the opposite end of the shaft 101, a gear 103 which is secured to a vertical shaft 104 and is driven by the worm 102, a gear 105 which is also secured to the shaft 104, and a gear 106 which is secured to a shaft 107 and is driven by the gear 105 and to which the cams 81 and 82 are attached. As shown in FIG. 15, the cams 81 and 82 are of annular shape and are clamped to the gear 106 through a clamping plate 108 by screws 109. Thus, by releasing the screws 109 the annular positions of the cams 81 and 82 relatively to the gear 106 may be changed to thereby vary the upper and lower limits of travel.

As a safety feature, the hoist also includes a second mechanism generally indicated at 110 in FIGS. 1 and 18 for operating the air cylinder 78 to stop operation of the air motor 16 in the lifting direction in the event the mechanism 80 should fail to operate. The mechanism 110 includes a lever 111 which is mounted for rotation on a pivot 112 on one side of the housing 15 and a cam 113 which is secured to and rotates with the lever 111 and is adapted to operate a valve 114. A chain 115 is secured to one end of the lever 111 and has a weight 115a secured to the lower end thereof which surrounds and is freely slidable on the cable 12.

When the block or hook 12a which is secured to the lower end of the cable 12 is in a lowered position the weight 115a hangs freely and acts through the chain 115 to rotate the lever 111 and the cam 113 in a clockwise direction to a position in which the cam 113 releases the valve 114 so that the valve is closed. When the block or hook 12a is raised to a position in which it engages the weight 115a, it lifts the weight 115 thereby relieving the force of the weight on the lever 111. When the force of the weight on the lever 111 is relieved, an extension spring 116 connected to the cam 113 rotates the cam 113 and lever 116 in the counter clockwise direction whereby the cam 113 actuates the valve 114 to open the valve 114.

As shown in FIG. 18, one side of the valve 114 is connected to the T 87 and the other side valve 114 is connected through the shuttle valve 90 and the line 91 with the air cylinder 78. Thus, opening of the valve 114 admits air under pressure to the air cylinder 78 to operate the cylinder 78 and pivot the lever 72 to neutral position whereby the brakes 29 and 30 are applied and operation of the air motor 16 in a lifting direction is stopped.

Each of the valves 83, 92 and 114 are of conventional construction, and includes, as best shown in FIG. 17, an actuating plunger 117 which when pushed inwardly of the valve body moves a spool member 118 to the right against the force of a spring 119 allowing passage of fluid from a port 120 to a port 121.

From the preceding description it can be seen that there is provided a very simple, relatively inexpensive, but very efficient control system for an air hoist. Because of the simplicity and efficiency of this control system, it may be effectively utilized with a conventional electric hoist structure to provide an air hoist. Thus, by substituting an air motor for the electric motor of the electric hoist and substituting the control system of the invention for the electrical control system of the electric hoist, a very efficient air hoist may be obtained.

While one form of the invention has been shown and described, it will be appreciated that this is for the purpose of illustration and that changes and modifications

We claim:

1. In a hoist, load engaging means, a fluid motor for raising and lowering said load engaging means, brake means for applying a braking force to said fluid motor, spring means for applying said brake means, fluid pressure operated means for releasing said brake means against the force of said spring means, manually operable valve means movable from a neutral position to a position connecting said fluid pressure operable means and said fluid motor to a source of fluid under pressure whereby to operate said fluid pressure operable means to release said brake means and to operate said motor to raise and lower said load engaging means, further fluid pressure operable means for moving said valve means to neutral position against manual force applied to said valve means to stop operation of said fluid motor and release the fluid pressure on said fluid pressure operable means to allow said spring means to apply said brake means, and limit control means operable at predetermined limits of movement of said load engaging means to connect said further fluid pressure operated means to a source of fluid pressure whereby to move said valve means to said neutral position to stop operation of said fluid motor and release the pressure on said fluid pressure operated means whereby said brake means are applied by said spring means.

2. In a hoist, load engaging means, a fluid motor for raising and lowering said load engaging means, brake means for applying a braking force to said fluid motor, spring means for applying said brake means, fluid pressure operated means for releasing said brake means against the force of said spring means, manually operable valve means movable from a neutral position to a position connecting said fluid pressure operable means to a source of fluid under pressure through a dumping valve positioned closely adjacent said fluid pressure operable means whereby to operate said fluid pressure operable means to release said brake means and connecting said motor with said source of fluid under pressure to operate said motor to raise and lower said load engaging means, further fluid pressure operable means for moving said valve means to neutral position against manual force applied to said valve means to stop operation of said fluid motor and release the fluid pressure on said dumping valve whereby said dumping valve quickly dumps the fluid pressure on said fluid pressure operable means to allow said spring means to apply said brake means substantially instantaneously and limit control means operable at predetermined limits of movement of said load engaging means to connect said further fluid pressure operated means to a source of fluid pressure whereby to move said valve means to said neutral position to stop operation of said fluid motor and release the pressure on said dumping valve to dump the fluid pressure on said fluid pressure operated means whereby said brake means are applied by said spring means.

3. In a hoist, load engaging means, a fluid motor for raising and lowering said load engaging means, brake means for applying a braking force to said fluid motor, spring means for applying said brake means, fluid pressure operated means for releasing said brake means against the force of said spring means, valve means movable from a neutral position to a position connecting said fluid pressure operable means to a source of fluid under pressure through a dumping valve positioned closely adjacent said fluid pressure operable means whereby to operate said fluid pressure operable means to release said brake means and connecting said motor with said source of fluid under pressure to operate said motor to raise and lower said load engaging means, additional air operated means selectively connected to said fluid pressure and operable to return said valve means to neutral position after a predetermined amount of travel of said load engaging means, said valve means when moved to neutral position stopping operation of said motor and releasing the pressure on said dumping valve whereby said dumping valve quickly dumps the fluid pressure operated means so that said spring means apply said brake means substantially instantaneously.

4. In a hoist, load engaging means, a fluid motor for raising and lowering said load engaging means, manually operable valve means movable from a neutral position to a position connecting said fluid motor to a source of fluid under pressure whereby to operate said motor to raise and lower said load engaging means, fluid pressure operable means for moving said valve means to neutral position against manual force applied to said valve means to stop operation of said fluid motor, and limit control means operable at predetermined limits of movement of said load engaging means to connect said fluid pressure operated means to a source of fluid pressure whereby to move said valve means to said neutral position to stop operation of said fluid motor.

5. In a hoist, a cable drum, a fluid motor for rotating said drum in either direction, brake means for applying a braking force to said fluid motor, spring means for applying said brake means, fluid pressure operated means for releasing said brake means against the force of said spring means, manually operable valve means movable from a neutral position to a position connecting said fluid pressure operable means and said fluid motor to a source of fluid under pressure, whereby to operate said fluid pressure operable means to release said brake means and operate said motor to rotate said drum, further fluid pressure operable means for moving said valve means to neutral position against manual force applied to said valve means to stop operation of said fluid motor and release the fluid pressure on said fluid pressure operable means to allow said spring means to apply said brake means, and limit control means operable by predetermined rotation of said drum in either direction to connect said further fluid pressure operated means to a source of fluid pressure whereby to move said valve means to said neutral position to stop operation of said fluid motor and release the pressure on said fluid pressure operated means whereby said brake means are applied by said spring means.

6. In a hoist, a cable drum, a fluid motor for rotating said drum in either direction, manually operable control valve means movable in either direction from a neutral position to positions connecting said fluid motor to a source of fluid under pressure whereby to operate said motor to rotate said drum, fluid pressure operable means for moving said valve means to neutral position against manual force applied to said valve means to stop operation of said fluid motor, rotatable cam means connected with said drum and rotated in response to rotate of said drum, and valve means operated by said cam means after a predetermined rotation of said cam means to connect said fluid pressure operable means with a source of fluid pressure whereby to move said valve means to neutral position to stop operation of said motor.

7. In a hoist, load engaging means, a fluid motor for raising and lowering said load engaging means, manually operable valve means movable in one direction from a neutral position to a position connecting said fluid motor to a source of fluid under pressure to operate said motor to raise said load engaging means and movable in the opposite direction from said neutral position to a position connecting said fluid motor to said source of fluid under pressure to operate said motor to lower said load engaging means, first fluid pressure operable means for moving said valve means to neutral position against manual force holding said valve in one direction to stop operation of said fluid motor in one direction and second fluid pressure operable means for moving said valve means to neutral position against manual force holding said valve in the other direction, and limit control means operable at predetermined limits of movement of said load engaging means to connect said first or second fluid pressure operated means to a source of fluid pressure whereby to move said valve means to said neutral position to stop operation of said fluid motor.

8. In a hoist, a cable drum, a transmission, an air motor for rotating said drum in either direction through said transmission, brake means for applying a braking force to said fluid motor, spring means for applying said brake means, an air cylinder for releasing said brake means against the force of said spring means, manually rotatable valve means rotatable in each direction from a neutral position to positions connecting said air motor to a source of air pressure whereby to operate said motor to rotate said drum in either direction, said valve means in each rotated position also connecting said air cylinder with said source of air pressure whereby to release said brake means, further air cylinders for moving said valve means to neutral position against manual force applied to said valve means to stop operation of said air motor and release the air pressure on said air cylinder to allow said spring means to apply said brake means, and limit control means operable at predetermined limits of rotation of said load engaging means to connect said further air cylinders to a source of air pressure whereby to move said valve means to said neutral position to stop operation of said air motor and release the pressure on said air cylinder whereby said brake means are applied by said spring means.

References Cited by the Examiner
UNITED STATES PATENTS

| | | | |
|---|---|---|---|
| 496,569 | 5/1893 | Johnson | 254—173 |
| 1,277,218 | 8/1918 | Kalbach | 254—168 |
| 1,282,438 | 10/1918 | Lamb | 254—173 |
| 1,452,964 | 4/1923 | Falkenau | 254—173 |
| 1,459,032 | 6/1923 | Norling | 254—168 |
| 2,246,923 | 6/1941 | Mevnier | 254—168 |
| 2,368,039 | 1/1945 | Parker | 254—168 |
| 2,416,638 | 2/1947 | Morton | 254—173 |
| 2,831,554 | 4/1958 | Reynolds | 254—168 |
| 3,031,236 | 4/1962 | Driver | 254—173 |

SAMUEL F. COLEMAN, *Primary Examiner.*